US012618737B2

(12) United States Patent
Dormody et al.

(10) Patent No.: US 12,618,737 B2
(45) Date of Patent: May 5, 2026

(54) TRIGGERING THE COLLECTING AND/OR USING OF CALIBRATION DATA

(71) Applicant: NextNav, LLC, Sunnyvale, CA (US)

(72) Inventors: Michael Dormody, San Jose, CA (US); Deepak Joseph, Oakton, VA (US); Badrinath Nagarajan, Cupertino, CA (US); Arun Raghupathy, Bangalore (IN); Frank Yenshaw, San Mateo, CA (US)

(73) Assignee: NextNav, LLC, Santa Clara, CA (US)

( * ) Notice: Subject to any disclaimer, the term of this patent is extended or adjusted under 35 U.S.C. 154(b) by 631 days.

(21) Appl. No.: 18/152,228

(22) Filed: Jan. 10, 2023

(65) Prior Publication Data
US 2023/0221203 A1    Jul. 13, 2023

Related U.S. Application Data

(60) Provisional application No. 63/266,710, filed on Jan. 12, 2022.

(51) Int. Cl.
G01L 27/00    (2006.01)
G01S 5/02    (2010.01)

(52) U.S. Cl.
CPC .......... G01L 27/005 (2013.01); G01S 5/0295 (2020.05)

(58) Field of Classification Search
CPC ... G01L 27/002; G01L 27/005; G01S 5/0295; G01C 25/00; G01C 5/06; H04W 4/029; H04W 4/02; H04W 4/38
See application file for complete search history.

(56) References Cited

U.S. PATENT DOCUMENTS

| | | | |
|---|---|---|---|
| 2012/0290253 A1 | 11/2012 | Barrett et al. | |
| 2015/0247917 A1* | 9/2015 | Gum ..................... | H04W 4/029 |
| | | | 342/462 |
| 2016/0047648 A1* | 2/2016 | Edge ........................ | G01C 5/06 |
| | | | 73/384 |
| 2016/0080007 A1* | 3/2016 | Yong ..................... | H04B 15/02 |
| | | | 375/297 |
| 2016/0245716 A1 | 8/2016 | Gum et al. | |
| 2017/0363423 A1 | 12/2017 | Dormody et al. | |
| 2018/0181741 A1 | 6/2018 | Whaley | |
| 2019/0360886 A1 | 11/2019 | Dormody et al. | |
| 2020/0049501 A1 | 2/2020 | Han et al. | |
| 2020/0116483 A1 | 4/2020 | Pormody et al. | |
| 2021/0389204 A1 | 12/2021 | Dormody et al. | |
| 2021/0396619 A1* | 12/2021 | Wang ..................... | H04W 4/38 |
| 2022/0136830 A1 | 5/2022 | Dormody et al. | |

OTHER PUBLICATIONS

International Search Report and Written Opinion dated Apr. 14, 2023 for PCT Patent Application No. PCT/IB2023/050218.

* cited by examiner

*Primary Examiner* — Catherine T. Rastovski
*Assistant Examiner* — Matthew W. Baca
(74) *Attorney, Agent, or Firm* — MLO, a professional corp.

(57)    ABSTRACT

An alert indicates that a situation conducive to calibrating a barometric pressure sensor of the user device might have occurred. In response, calibration data is collected for calibrating the barometric pressure sensor. The calibration data is used to perform a calibration process and generate a calibration value for the barometric pressure sensor.

18 Claims, 4 Drawing Sheets

COMMUNICATIONS
TO/FROM DEVICES

SERVER(S)
104

TRIGGERING THE COLLECTING AND/OR USING OF CALIBRATION DATA

RELATED APPLICATIONS

This application claims priority to U.S. Provisional Patent Application No. 63/266,710, filed on Jan. 12, 2022, and entitled, "Triggering the Collecting and/or Using of Calibration Data", which is hereby incorporated by reference in its entirety and for all purposes.

BACKGROUND

Barometric-based altitude systems rely on a well-calibrated barometric pressure sensor in a consumer or user device, typically a mobile device. Under ideal conditions, the pressure sensor would already be well-calibrated and would remain so. However, most consumer-grade pressure sensors are not well-calibrated. Additionally, the calibration is prone to drift, i.e., change over time in a positive and/or negative direction. Thus, such pressure sensors have to be recalibrated from time to time using a calibration value that is derived using calibration data. The calibration data typically includes, but is not limited to, atmospheric pressure and temperature measurements generated using the pressure sensor to be calibrated in addition to reference pressure and temperature measurements generated by a reference system. The derived calibration value may be an offset in pressure, an offset in altitude, or a polynomial calibration equation that takes various inputs, such as temperature and/or pressure.

The calibration data needs to be reliable in order to result in a good, reliable calibration value. However, it can be difficult to determine when the calibration data is most likely to be reliable.

SUMMARY

In some embodiments, a method includes: receiving, by a client running on a computer processor of a user device, an alert indicating that a situation conducive to calibrating a barometric pressure sensor of the user device might have occurred; in response to the alert, collecting, by the client running on the computer processor, calibration data for calibrating the barometric pressure sensor; uploading, by the client running on the computer processor, the calibration data to a calibration server for the calibration server to perform a calibration process and generate a calibration value for the barometric pressure sensor; and receiving, by the client running on the computer processor, the calibration value from the calibration server.

In some embodiments, the method further includes: setting, by the client running on the computer processor, a trigger for an operating system of the user device to send the alert to the client when a trigger event occurs, the trigger event indicating that the situation conducive to calibrating the barometric pressure sensor of the user device might have occurred. In some embodiments, the method further includes: performing, by the client running on the computer processor, a trigger event check to confirm whether the trigger event has occurred; in response to the trigger event check not passing, waiting, by the client running on the computer processor, for a next alert; and in response to the trigger event check passing, performing the collecting of the calibration data. In some embodiments, the trigger event is a Wi-Fi connect trigger, which occurs when the user device is detected to have connected to a Wi-Fi access point. In some embodiments, the trigger event is a Wi-Fi disconnect trigger, which occurs when the user device is detected to have disconnected from a Wi-Fi access point. In some embodiments, the trigger event is a charging trigger event, which occurs when a battery of the user device is detected to be charging. In some embodiments, the trigger event is a charging trigger event, which occurs when the user device is detected to have attached to an external power source. In some embodiments, the trigger event is a significant motion trigger, which occurs when a detected motion for the user device exceeds a motion threshold value. In some embodiments, the trigger event is a Wi-Fi RSSI-change trigger, which occurs when a strength of a Wi-Fi signal received by the user device as indicated by a Received Signal Strength Indicator (RSSI) is detected to have changed by more than a Wi-Fi RSSI-change threshold. In some embodiments, the trigger event is a geofence trigger, which occurs when the user device is detected to have traversed a boundary of a geofence. In some embodiments, the trigger event is a significant location change trigger, which occurs when a distance between two locations at which the user device has been detected to exceed a distance threshold value. In some embodiments, the trigger event is an activity trigger, which occurs when the user device is detected to have experienced a predetermined activity. In some embodiments, the activity trigger further occurs when a confidence level for the predetermined activity is greater than an activity confidence threshold value. In some embodiments, the trigger event is an activity transition trigger, which occurs when the user device is detected to have experienced a predetermined activity transition. In some embodiments, the activity transition trigger further occurs when a confidence level for the predetermined activity transition is greater than an activity transition confidence threshold value. In some embodiments, the trigger event is an activity transition pair trigger, which occurs when the user device is detected to have experienced a predetermined activity transition pair. In some embodiments, the activity transition trigger further occurs when a confidence level for the activity transition pair is greater than an activity transition pair confidence threshold value. In some embodiments, the trigger event is a time period trigger, which occurs when a specified time interval is detected to have passed since a previous collection of calibration data. In some embodiments, the trigger event is a specific time trigger, which occurs at a specified time point during a day.

In some embodiments, a method includes: triggering collection of calibration data for calibrating a pressure sensor of a mobile device in response to at least one of: 1) detecting that a battery of the mobile device is charging, 2) detecting an activity of the mobile device, 3) detecting an activity transition for the mobile device, 4) detecting an activity transition pair for the mobile device, 5) detecting a connection by the mobile device to a wireless communication device, 6) detecting a wireless connection received signal strength indicator level change, 7) detecting a predetermined time of day, or 8) detecting a significant motion by the mobile device.

DETAILED DESCRIPTION

Calibration of a barometric pressure sensor of a mobile device (i.e., a user device or a computer device) should be done at times when the conditions under which the calibration data was collected or measured are conducive to a proper or reliable calibration. The calibration value generated by the calibration process under such conditions can thereafter be applied to the pressure measurements generated by the pressure sensor so that a relatively accurate altitude can be determined from the calibrated pressure measurements generated therefrom.

In some embodiments, the mobile device might collect calibration data for calibration purposes on a continual basis. However, in some embodiments, in order to save on computer processor usage, memory space, battery power consumption, and/or wireless transmissions, a client software ("client") operating on the mobile device relies on a trigger event to start collecting the calibration data, so that the client (or the mobile device) is not always collecting such calibration data but does so only after being triggered. Additionally, in some embodiments, the trigger event also triggers the calibration process, which uses the calibration data to generate a calibration value for the pressure sensor.

In some embodiments, the types of events that can be used to trigger the calibration data collection and/or the calibration process are generally those that are known to usually be associated with conditions or situations that are conducive to a proper or reliable calibration. Thus, the trigger alerts the client that the situation is of interest, so the collection and use of calibration data can be turned off at other times, thereby saving on computer processor usage, memory space, battery power consumption, and/or wireless transmissions at such times. The trigger events are not a guarantee that conditions are conducive to a proper or reliable calibration at the time of the trigger event, but rather are an indication that a situation conducive to calibrating the barometric pressure sensor of the mobile device might have occurred. In some embodiments, the trigger events are also indications that the conditions for collecting calibration data might not be a significant power consumption burden on the internal battery of the mobile device. Therefore, the trigger event also triggers the client or a system server to determine or confirm whether conditions are conducive to a proper or reliable calibration and power consumption is not likely to be an issue before collecting and/or using the calibration data. Thus, after the trigger event occurs and the client or the system server determines that conditions are conducive to a proper or reliable calibration, collection and/or usage of the calibration data begins.

Figure 1:
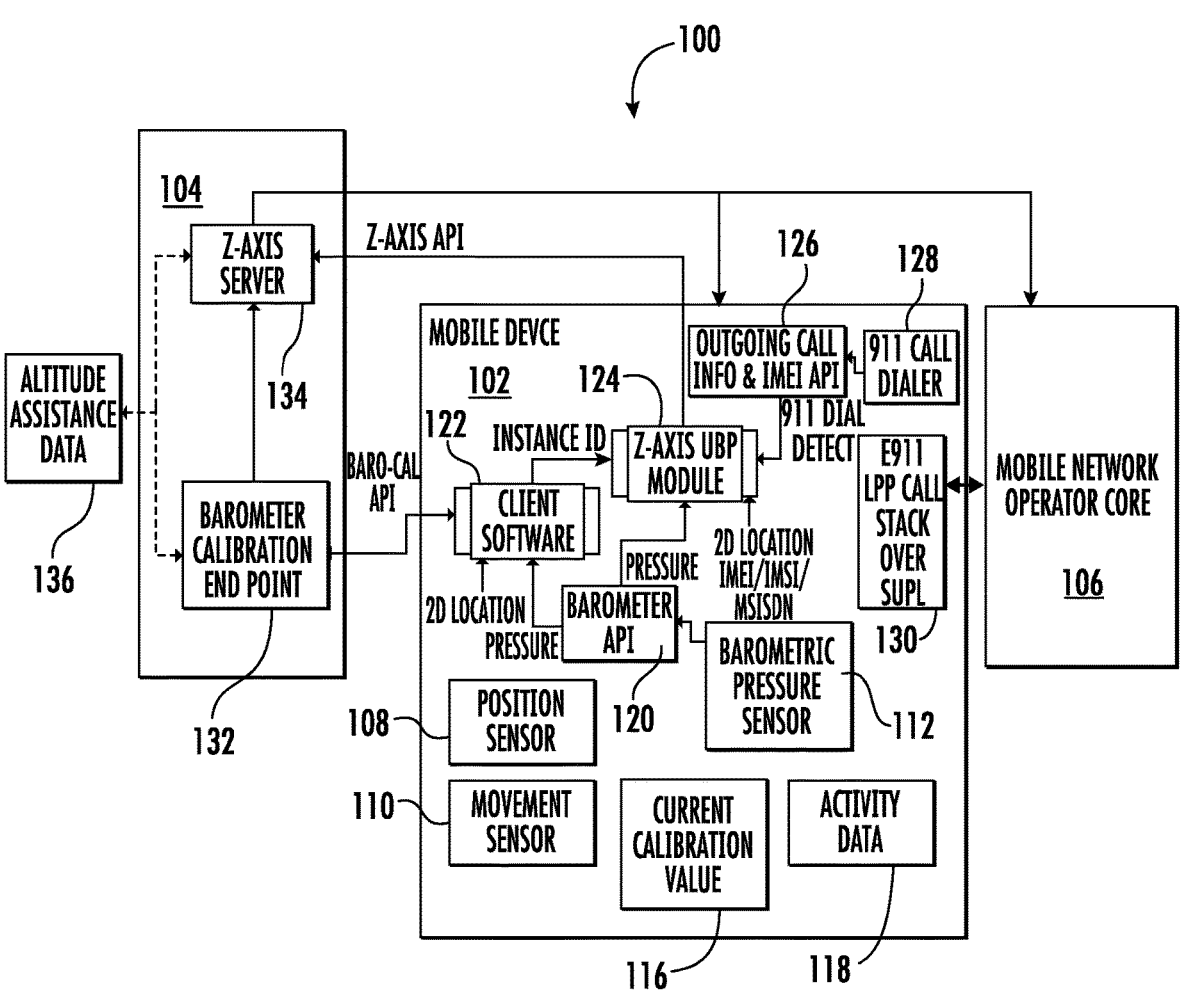
FIG. 1 is a simplified schematic diagram of an example calibration system for determining whether to calibrate a barometric pressure sensor in a mobile device and performing the calibration process, in accordance with some embodiments.

An example system 100 for triggering and performing the collection of the calibration data and the calibration process by the client and/or the system server is shown in FIG. 1, in accordance with some embodiments. The example system 100 generally includes the mobile device (or user device) 102 and the system server 104, among other hardware and software components not shown for simplicity of illustration and description. Although only one mobile device 102 is shown, it is understood that the system 100 may have any number of mobile devices 102. The components of the system 100 generally communicate with each other via a network that may be any appropriate combination of the Internet, cell phone communication systems, broadband cellular networks, wide area networks (WANs), local area networks (LANs), wireless networks, networks based on the IEEE 802.11 family of standards (Wi-Fi networks), and other data communication networks.

Additionally, an example situation in which the system 100 can be used is when the mobile device 102 makes a 911 call for emergency services, and it is necessary to provide the altitude of the mobile device to the 911 emergency service, so that the emergency responders can find the user of the mobile device in case the user and mobile device are in a multistory building. Therefore, a mobile network operator core 106 of a mobile communication service provider network (e.g., VERIZON™, T-MOBILE™, or other cellular phone service) is also shown as part of the system 100. However, it is understood that the system 100 can be used in other situations (e.g., for the mobile device 102, the operating system thereof, or an application thereon to obtain the altitude), so the mobile network operator core 106 may be optional or unnecessary in some embodiments of the present invention.

The mobile device 102 generally includes a position sensor 108, a movement sensor 110, a barometric pressure sensor 112, a current calibration value 116 (having a calibration amount and a calibration confidence interval), activity data 118, a barometer application programming interface (API) 120, the client 122, among other hardware, software and data. For embodiments involving a 911 call for emergency services, the mobile device 102 further includes a Z-axis uncompensated barometric pressure (UBP) module 124, an outgoing call information and IMEI (International Mobile Equipment Identity) API 126, a 911 call dialer 128, and an E911 LPP (LTE Positioning Protocol) call stack over SUPL (Secure User Plane Location) 130.

The position sensor 108 generally represents one or more appropriate sensor devices and associated software for detecting a position of the mobile device 102, such as for a Global Navigation Satellite System (GNSS, such as GPS, GLONASS, Galileo, Compass/Beidou), a terrestrial transmitter system, or a hybrid satellite/terrestrial system, among others. The movement sensor 110 generally represents one or more appropriate sensor devices and associated software for detecting movement of the mobile device 102, such as an accelerometer, a gyroscope, a magnetometer/compass, and/or a pedometer, among others. The barometric pressure sensor 112 represents any appropriate sensor device that generates an atmospheric pressure measurement with which the mobile device 102 determines its altitude. The current calibration value 116 is used by the mobile device 102 or the barometric pressure sensor 112 to calibrate the barometric pressure sensor 112, i.e., to adjust the raw pressure measurement to obtain a more accurate adjusted pressure measurement with which to determine the altitude. The activity data 118 generally represents data gathered and/or generated by the mobile device 102 to determine its activity. The barometer API 120 generally represents any appropriate software and/or hardware for interfacing with the barometric pressure sensor 112 to receive the raw sensor data and to generate therefrom the atmospheric pressure measurement, which may or may not be calibrated at this point.

The client 122 generally facilitates the on-going calibration of the barometric pressure sensor 112. Thus, the client 122 collects the calibration data at key points in time (i.e., in response to the trigger events) and uploads the calibration data to the system server 104 (e.g., via a barometer calibration API—"Baro-cal API") where it is used to generate barometric sensor calibration correction values (i.e., "calibration values").

The Z-axis UBP module 124 generally facilitates the generation of altitude data at the system server 104, detects an out-going 911 call or 911 text message (e.g., a text, SMS, RCS, or RTT message), collects the relevant data, and uploads this data to a Z-axis server 134 (via a Z-axis API) of the system server 104 where it is used to generate the altitude of the mobile device 102. Thus, the Z-axis UBP module 124 is a module for collecting and sending the (typically raw, uncompensated) barometric pressure data from the barometric pressure sensor 112 (and other data for determining altitude of the mobile device 102) to the system server 104. This data may include an instance identifier (ID) of the client 122, the pressure measurement from the barometer API 120 and the barometric pressure sensor 112, the 2D or horizontal location of the mobile device 102 from the position sensor 108, the IMEI of the mobile device 102, international mobile subscriber identity (IMSI) of the mobile device 102, the Mobile Station Integrated Services Digital Network (MSISDN) phone number of the mobile device 102, Wi-Fi information, and/or GNSS information. In some embodiments, the Z-axis UBP module 124 performs these tasks when the operating system or an application of the mobile device 102 requests altitude data. For embodiments involving a 911 call for emergency services, the Z-axis UBP module 124 performs these tasks when triggered by a 911 dial detect signal or message (or 922 or other test number) from the outgoing call information and IMEI API 126. In some embodiments, this 911 trigger happens only when the mobile device 102 is on an authorized service provider network, but this trigger may happen when the mobile device 102 is on any mobile communication service provider (i.e., the "service provider") in other embodiments.

The outgoing call information and IMEI API 126, the 911 call dialer 128, and the E911 LPP call stack over SUPL 130 are conventional components for placing a 911 emergency call to the mobile network operator core 106. When the mobile device 102 places a 911 emergency call, the outgoing call information and IMEI API 126 sends the 911 dial detect signal or message to the Z-axis UBP module 124.

Figure 2:
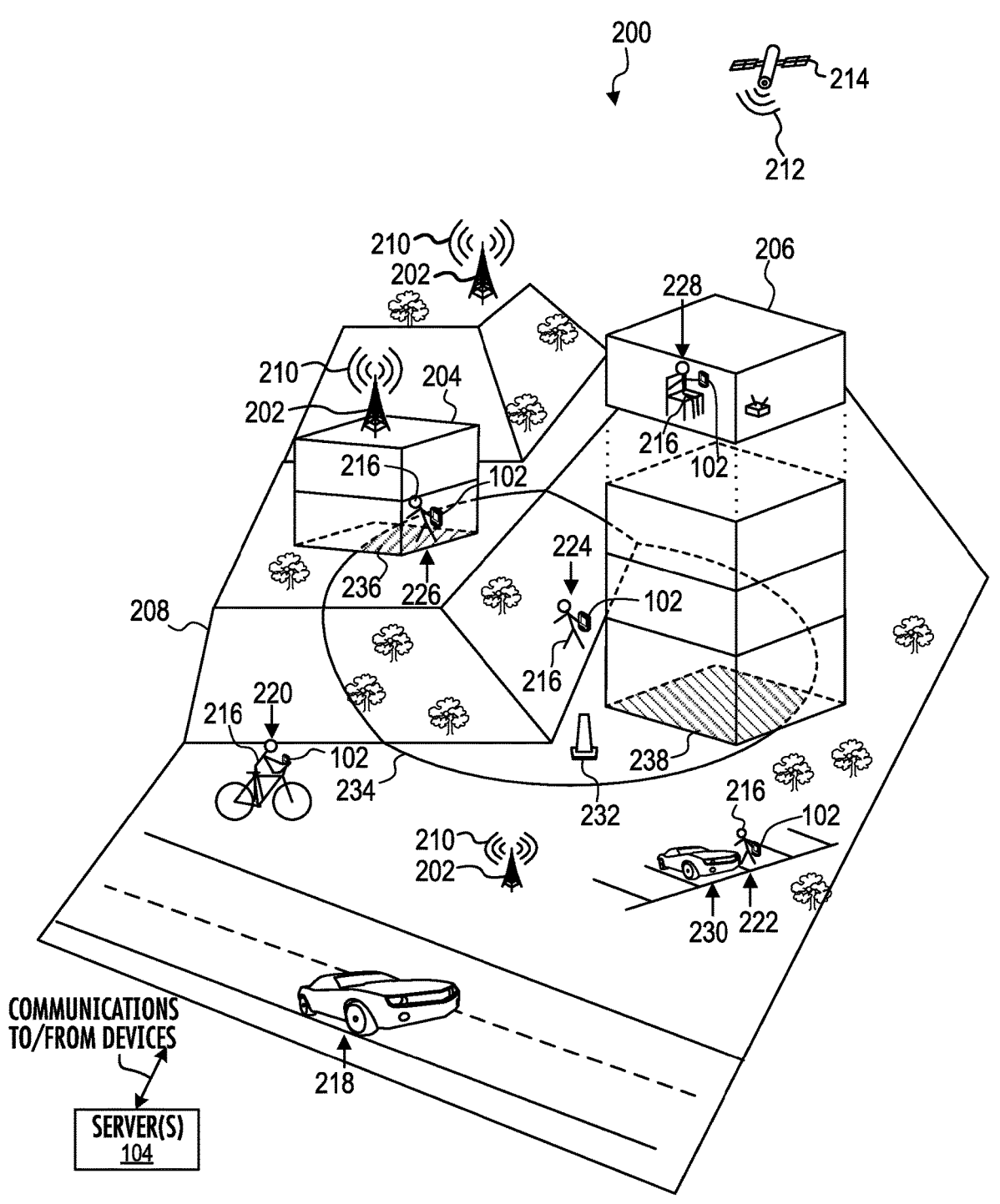
FIG. 2 is a simplified environment in which a mobile device can be used and a barometric pressure sensor in the mobile device can be calibrated, in accordance with some embodiments.

FIG. 2 shows a simplified example environment 200 in which mobile devices 102 can be used and the barometric pressure sensors 112 therein can be calibrated, in accordance with some embodiments. The environment 200 includes a network of terrestrial transmitters (or reference pressure stations) 202, at least one of the mobile devices 102, and the system server 104. The system server 104 exchanges communications with various devices, such as the mobile device 102. Each of the transmitters 202 and the mobile device 102 may be located at different altitudes or depths that are inside or outside various natural or manmade structures (e.g., buildings 204 and 206), relative to different elevations throughout a terrain 208, as illustrated by examples in FIG. 2. Positioning signals 210 and 212 are transmitted from the transmitters 202 and satellites 214, respectively, and are subsequently received by the mobile device 102 using known transmission technologies. For example, the transmitters 202 may transmit the signals 210 using one or more common multiplexing parameters that utilize time slots, pseudorandom sequences, frequency offsets, or other approaches, as is known in the art or otherwise disclosed herein. Examples of possible hardware, software and data components in the transmitters 202, the mobile device 102, and the system server 104 are shown in FIGS. 1 and 5, described herein. In particular, each transmitter 202 and mobile device 102 may include atmospheric sensors (e.g., barometric pressure sensors and temperature sensors, as appropriate) for generating measurements of atmospheric conditions (e.g., atmospheric pressure and temperature) that are used to estimate an altitude of the mobile device 102 or to calibrate the barometric pressure sensor 112 therein.

As a person/user 216 with the mobile device 102 moves throughout such an example environment 200, the mobile device 102 may experience a variety of activities or diversity of locations. For example, the mobile device 102 may be moving rapidly (e.g., location changes significantly in a relatively short time) when it is in a vehicle (as on a road at 218) that the user is driving or riding in. In another example, the mobile device 102 may be moving somewhat rapidly (e.g., slower than is typical for driving, but faster than is typical for walking or running) when the user 216 is riding a bicycle (as on the terrain 208 at 220). In another example, when the user 216 is walking or running (as at 222, 224 or 226), the mobile device 102 may be moving somewhat slowly (relative to driving or biking). In such scenarios, movement data from the accelerometer may indicate steps taken by the user while the barometric pressure data is not changing significantly. In another example, the mobile device 102 may be still (e.g., the movement data from the accelerometer is stable) when the user 216 is simply standing or sitting (as in an office at 228) or parked in a vehicle (as in a parking lot at 230).

During some of these activities or at some of these locations, the mobile device 102 may encounter one or more opportunities that are conducive to calibrating its barometric pressure sensor 112. In some embodiments, the mobile device 102 sends time, location and pressure data to the system server 104 for the system server 104 to determine when a calibration opportunity has occurred and to perform various calibration techniques. The mobile device 102 generally sends this data in data packets to the system server 104 at regular time intervals, when prompted by the system server 104, or when the mobile device 102 detects a calibration opportunity. (In other embodiments, the mobile device 102 determines when a calibration opportunity has occurred and performs the calibration techniques by obtaining relevant data from the system server 104.)

In an example, when location data generated by the mobile device 102 indicates that the mobile device 102 is within a threshold distance of a known location 232, such as a monument or a survey marker, for which the altitude has been well-established and is thus known, then an opportunity has occurred to perform a calibration technique based on the known location 232. The calibration result in this example is generally based on the known altitude of the known location 232, any known or estimated altitude variation in the terrain surrounding the known location 232 and the mobile device 102, pressure measurements from the barometric pressure sensor 112 of the mobile device 102, and pressure and temperature measurements generated by the nearest transmitters 202. In another example, when the location data generated by the mobile device 102 indicates that the mobile device 102 is within a geofence 234 that encompasses an area of terrain for which a range of altitude is known or can be estimated, then an opportunity may have occurred to perform a calibration technique using data for the terrain or geofence 234. Additionally, if the geofence 234 overlaps with a structure, such as the buildings 204 and 206 as indicated by the shaded areas 236 and 238, then the calibration technique may use building and terrain data. The calibration result in this example is generally based on a known or estimated average altitude of the terrain within the geofence 234, any known or estimated altitude variation in the terrain within the geofence 234, a known or estimated number and height of floors of the buildings 204 and 206, pressure measurements from the barometric pressure sensor 112 of the mobile device 102, and pressure and temperature measurements generated by the nearest transmitters 202.

Other examples of techniques for calibrating a barometric pressure sensor in a mobile device within an overall calibration system are provided in U.S. Pat. No. 10,514,258 B2, filed Aug. 31, 2017, titled "Systems and Methods for Calibrating Unstable Sensors", U.S. Pat. No. 11,073,441, filed Mar. 26, 2019, titled "Systems and Methods for Determining When to Calibrate a Pressure Sensor of a Mobile Device", U.S. Pat. No. 11,536,564, filed May 7, 2019, titled "Systems and Methods for Pressure-Based Estimation of a Mobile Device Altitude or Calibration of a Pressure Sensor"; and U.S. Pat. No. 11,333,567, filed Jun. 4, 2021, titled "Constraining Barometric Pressure Sensor Calibration with Sporadic Data Collection", which are incorporated as if fully set forth herein. These disclosures describe example calibration techniques, and when the data in the data packet from the mobile device 102 indicates that one or more of these calibration techniques can be performed, then an opportunity has occurred to calibrate the barometric pressure sensor 112 for the mobile device 102, and the system server 104 detects the occurrence of a calibration opportunity based on the data in the data packets.

In some embodiments, the system server 104 generally includes a barometer calibration API end point 132 and the Z-axis server 134. The barometer calibration API end point 132 (i.e., a calibration server) generally performs the calibration process to generate the calibration value for the barometric pressure sensor 112 of the mobile device 102 using the calibration data units received from the client 122 and altitude assistance data 136. The Z-axis server 134 generally performs the altitude-determination process to determine the altitude of the mobile device 102 using the pressure and 2D location data received from the Z-axis UBP module 124 of the mobile device 102, the current calibration value generated by the barometer calibration API end point 132, and the altitude assistance data 136. The Z-axis server 134 sends the altitude (Z-axis value) and the altitude uncertainty to the mobile device 102 and the mobile network operator core 106. The Z-axis server 134 also sends the 2D location data and the IMEI to the mobile network operator core 106.

In some embodiments, the client 122 generally accesses the data/services it needs for operation as follows: the location data and GNSS information (fine location, access to location providers, e.g., Network-Provider and GPS-Provider) from the position sensor 108, the data service of the mobile device 102, the pressure data from the barometric pressure sensor 112, the sensor data from other sensors (e.g., the movement sensor 110, a temperature sensor, etc.) of the mobile device 102, and Wi-Fi information of a Wi-Fi access point (WAP) to which the mobile device 102 has made a wireless connection. In some embodiments, the client 122 does not ask an end-user for permission to run/operate.

In some embodiments, the client 122 runs (e.g., collects the data for calibration) only when the mobile device 102 is on the authorized service provider network. In other embodiments, the client 122 may also operate when the mobile device 102 is on any service provider.

In some embodiments, the client 122 detects the authorized or other service provider by using the mobile country code (MCC) and mobile network code (MNC) identifiers provided by the service provider as read from the mobile device 102 based on the service provider network it is connected to and via the SIM information of the mobile device 102. (The mobile country code (MCC) is used in combination with the mobile network code (MNC), a combination known as an "MCC/MNC tuple", to uniquely identify a mobile network operator (carrier) using the Global System for Mobile Communications (GSM) (including GSM-R), Universal Mobile Telecommunication System (UMTS), Long Term Evolution (LTE), and 5G public land mobile networks, as wells as some Code-Division Multiple Access (CDMA), Integrated Digital Enhanced Network (iDEN), and satellite mobile networks.)

In some embodiments, the client 122 automatically runs on initial install on the mobile device 102 and re-launches on each re-boot and power-cycle of the mobile device 102. In some embodiments, on its initial run (post installation), the client 122 generates an instance ID and stores it in local storage (i.e., on the mobile device 102) with an "ID create" timestamp, e.g., in Unix time milliseconds. In some embodiments, on initialization, the client 122 checks locally for the existence of the instance ID. If present, the client 122 does not generate a new instance ID. If not present, the client 122 generates the instance ID and stores it locally for future use. In some embodiments, the client 122 generates the instance ID by creating a HASH from a string that is result of concatenating pressure data (e.g., a single sample value in Pascals) for a pressure measurement from the barometric pressure sensor 112, a timestamp (e.g., in Unix time milliseconds), and a random number from the operating system. In some embodiments, the client 122 allows for a secure or obscure interface for the Z-axis UBP module 124 to bind to the client 122 and access the instance ID.

In some embodiments, the client 122 configures the service provider and the API-KEY when installed on the mobile device 102 either via over-the-air (OTA) methods or in a manufacturing process. In some embodiments, the client 122 implements security features, such as local data encryption, code obfuscation/protection, and API-Key obfuscation/protection.

In some embodiments, the client 122 reads a configuration object stored locally on the mobile device to retrieve a value of a calibration data collection mode. The value for the collection mode state may be "adaptive", "normal" or "urgent". Based on the value of the collection mode, the client 122 sets up its behavior. In some embodiments, if the collection mode in the configuration object is set to "adaptive", then the client 122 initially starts in the "urgent" mode and applies the configurations of the "urgent" mode to its operation. After each calibration data collection, the client 122 re-evaluates thresholds for the adaptive collection (i.e., adaptive collection thresholds) to check whether it should change any collection parameters. In the adaptive collection mode, the client 122 can change between the urgent mode and the normal mode, depending on the thresholds for adaptive collection. In some embodiments, there may be more collection modes than just the urgent mode and the normal mode, e.g., additional modes representing different gradations of adaptive collection thresholds. In some embodiments, the client 122 uses larger values for a trigger quantity, a data collection quantity, and an upload frequency when in the urgent mode than those used when in the normal mode. Factors (set in the configuration object) used to determine whether the client 122 is in the normal mode or the urgent mode generally include a quality of the current calibration value and a number of calibration data collection events stored locally in the mobile device 102. The quality of the current calibration value may be received in the barometer calibration API response and may be indicated as a remaining number of calibration days (a "calibration days remaining" value) before the current calibration value needs to be updated. The remaining number of calibration days value indicates the remaining number of days that the current calibration value 116 is considered to be reliable. In response to the number of calibration data collection events stored locally being less than a threshold number of calibration data units (e.g., 3, 4, 5, etc. calibration data units over a configurable predetermined number of days), the client 122 enters the urgent mode. In response to the number of calibration data collection events stored locally being greater than or equal to the threshold number of calibration data units, the client 122 enters the normal mode.

In some embodiments, the client 122 maintains any updates to the configuration object from a response from a barometer calibration end point 132 in the system server 104 via the barometer calibration API and uses the updated configuration object on subsequent device power-cycles and re-boots to reset the behavior of the client 122. Thus, the client 122 maintains the current collection mode state (e.g., urgent or normal) across power-cycle and re-boot events. In some embodiments, the client 122 sets up the calibration data collection triggers using configuration object values in the configuration object for the specified collection mode.

In some embodiments, the client 122 decrements the remaining number of calibration days value every 24 hours after receiving it from the barometer calibration API response. In some embodiments, the client 122 updates the locally stored remaining number of calibration days value using a barometer calibration remaining days value received in the barometer calibration API response from the barometer calibration end point 132 in the system server 104. The length of time within which the calibration value is considered to be sufficiently accurate is called the "calibration days remaining". The calibration days remaining can be estimated using a projected aging model of the barometric pressure sensor 112 and an acceptable accuracy threshold. For example, if the aging model is 1 Pa/day, the starting accuracy is 5 Pa, and the acceptable accuracy threshold is 10 Pa, it would take 5 days for the accuracy of the barometric pressure sensor 112 to be considered to have degraded to the acceptable accuracy threshold.

Additionally, in some embodiments, the client 122 uses the barometer calibration remaining days value returned in the barometer calibration API response to determine the collection mode (e.g., "urgent" or "normal"). The client 122 sets its collection mode to the urgent mode in response to the barometer calibration remaining days value being less than a calibration remaining days threshold value (e.g., 3 days, 4 days, 5 days, etc.) provided in the configuration object. Otherwise, in response to the barometer calibration remaining days value being greater than or equal to the calibration remaining days threshold value, the client 122 sets its collection mode to the normal mode.

In some embodiments, the client 122 implements mechanisms for the calibration data collection trigger events based on settings provided in the configuration object. The client 122 then uses the trigger events to determine if the calibration data should be collected for calibration purposes. In some embodiments, the mechanisms for the trigger events set up a "wake-up" signal (i.e., an alert signal) in the operating system of the mobile device 102 to minimize the power consumption by the client 122. The wake-up signal indicates that a trigger event (or a condition or situation conducive to calibrating the barometric pressure sensor 112) might have occurred. Thus, when any of the trigger events occur, the operating system sends the wake-up signal to the client 122. In response to receiving the wake-up signal, the client 122 begins operations to determine if the calibration data should be collected. (Alternatively, the client 122 begins the calibration data collection.) In other embodiments, the client 122 receives the trigger events directly, rather than a wake-up signal from the operating system. In response to determining by the client 122 that the calibration data should be collected, the client 122 collects the calibration data and transmits it to the barometer calibration end point 132 in the system server 104. In response to determining by the client 122 that the calibration data should not be collected, the client 122 stops operations and waits for the next wake-up signal (or trigger event).

Examples of trigger events may include, but not be limited to, a Wi-Fi connect trigger, a Wi-Fi disconnect trigger, a charging trigger, a significant motion trigger, a Wi-Fi RSSI-change trigger, a geofence trigger, a significant location change trigger, an activity trigger, an activity transition trigger, an activity transition pair trigger, a time period trigger, and a specific time trigger, among other possible trigger events. In some embodiments, only some of the types of trigger events might be used for the calibration data collection process. The types of trigger events that may be implemented in or for the client (or the mobile device) may depend on whether the trigger events are supported by the operating system or available applications of the mobile device 102.

The Wi-Fi connect trigger is set up by the client 122 for the operating system to trigger the wake-up signal to the client 122 whenever it detects that the mobile device 102 has just connected to a Wi-Fi or local area network (LAN) access point or other wireless communication device. This is advantageous because connection to a Wi-Fi access point can indicate a potential arrival at a specific location (e.g., after parking a car and walking inside a building at work or home). The specific location might be conducive for calibration because it is a location to which the user and mobile device 102 often return or which is otherwise already known to the system server 104, since many Wi-Fi access points rarely move from their given location. Thus, the altitude at such a location is likely to have already been accurately determined in the past, and so this altitude can be used to accurately calibrate the barometric pressure sensor 112.

The Wi-Fi disconnect trigger is set up by the client 122 for the operating system to trigger the wake-up signal to the client 122 whenever it detects that the mobile device 102 has just disconnected from a Wi-Fi or local area network (LAN) access point or other wireless communication device. This is advantageous because disconnection from a Wi-Fi access point can indicate a potential departure from a location that is not conducive for calibration, such as upon leaving a multi-story building wherein it might have been uncertain which floor the user and mobile device 102 were on, thereby rendering the altitude of the mobile device 102 uncertain. Leaving a building commonly results in the user and mobile device 102 being at ground level in an outdoor terrain, such that available terrain data can then be used to obtain a relatively accurate altitude of the mobile device 102. Thus, this altitude can be used to accurately calibrate the barometric pressure sensor 112.

The charging trigger is set up by the client 122 for the operating system to trigger the wake-up signal to the client 122 whenever it detects that the mobile device 102 is charging its internal battery or detects that the mobile device 102 has been plugged into or attached to a charging device or power source (external to the mobile device). This is advantageous because the concern for battery power consumption by the mobile device 102 is not an issue in this situation, because the power supply of the battery is being replenished. Thus, the client 122 can collect calibration data during this time without any drain on the battery. Additionally, users commonly charge their mobile devices 102 at the same location, e.g., by their bedside at night or on their desk at work. Thus, this location can become well known to the system server 104 such that the altitude at such a location is likely to have already been accurately determined in the past, so this altitude can be used to accurately calibrate the barometric pressure sensor 112. Of course, the user might also charge the mobile device 102 in other situations, e.g., while driving in a car, so the system server 104 would detect such situations and not perform the calibration process.

The significant motion trigger is set up by the client 122 for the operating system to trigger the wake-up signal to the client 122 whenever it detects that the mobile device 102 has undergone significant motion, e.g., a detected motion for the mobile device 102 exceeds a motion threshold value, a detected speed or acceleration of the mobile device 102 exceeds a speed threshold or acceleration threshold, or a detected change in location exceeds a location change distance threshold within a given time period. This is advantageous because some degree of significant motion could indicate that the mobile device 102 is physically moving in or around a diversity of several locations, possibly over a relatively short period of time. Diversity of locations can increase the chance that there should be a good opportunity to calibrate the barometric pressure sensor 112 at one or more of the locations. Thus, the significant motion trigger ensures that the client 122 checks the calibration conduciveness of each of these locations so that such opportunities are not missed. Additionally, if the operating system, the mobile device 102, or the system server 104 provides a level of confidence for the significant motion, then the client 122 reads/obtains that value too, which can be used to determine a confidence for the resulting calibration value, because a higher confidence in the activity that triggered the calibration data collection can potentially enhance the confidence of the resulting calibration value.

The Wi-Fi RSSI-change trigger is set up by the client 122 for the operating system to trigger the wake-up signal to the client 122 whenever it detects that a strength of a Wi-Fi signal (as indicated by the Received Signal Strength Indicator (RSSI) level) received by the mobile device 102 changes significantly. A threshold value for the Wi-Fi signal strength change or Wi-Fi RSSI-change (i.e., a "Wi-Fi RSSI-change threshold") can be configurable, e.g., 40%, 50%, 60%, etc. A default value thereof can be in dBm of relative change or a percentage of relative change. This is advantageous because Wi-Fi signal strength changes could indicate moving through/around different Wi-Fi locations, indicating movement like driving/walking, and hence indicating a diversity of locations. As mentioned above, diversity of locations can increase the chance that there is a good opportunity to calibrate the barometric pressure sensor 112 at one or more of the locations. Thus, the Wi-Fi RSSI-change trigger ensures that the client 122 checks the calibration conduciveness of each of these locations so that such opportunities are not missed.

The geofence trigger is set up by the client 122 for the operating system to trigger the wake-up signal to the client 122 whenever a boundary of a geofence is traversed, i.e., the mobile device 102 moves into or out of the geofence. The radius, shape and/or boundaries of the geofence may be configurable. This is advantageous because geofences are sometimes set up around significant landmarks or known locations that are already known to the system server 104. Thus, the altitude at such a location is likely to have already been accurately determined in the past or provided in terrain data, so this altitude can be used to accurately calibrate the barometric pressure sensor 112.

The significant location change trigger is set up by the client 122 for the operating system to trigger the wake-up signal to the client 122 whenever a significant location change event occurs. A significant location change event is determined by the mobile device 102 when a distance between two locations or points at which the mobile device 102 has been within a predetermined time period (i.e., a "location change value") exceeds or equals a configurable distance threshold value that may be provided in the configuration object. This is advantageous because a significant location change is another type of event that can indicate a diversity of locations for the mobile device 102. As mentioned above, diversity of locations can increase the chance that there is a good opportunity to calibrate the barometric pressure sensor 112 at one or more of the locations. Thus, the significant location change trigger ensures that the client 122 checks the calibration conduciveness of each of these locations so that such opportunities are not missed. Additionally, the location change value (i.e., the distance between the two points) used for triggering based on a significant location change may be configurable (e.g., 40 m, 50 m, 100 m, 200 m, or any other appropriate distance value that has been empirically determined to be likely to indicate a significant location change). Alternatively, the mobile device 102 may have built-in metrics that indicate a significant location change.

The activity trigger is set up by the client 122 for the operating system to trigger the wake-up signal to the client 122 whenever a predetermined activity (or activity context) is detected by the mobile device 102 and the confidence level for the activity is greater than or equal to an activity confidence threshold value (indicating an appropriate level at or above which the activity is likely to have occurred), thereby indicating that it is likely that the mobile device 102 is currently experiencing (or has experienced) the predetermined activity. (Some example activities may include, but not be limited to, driving, being still, walking, biking, running, and riding in a vehicle, among others.) This is advantageous because some activities (e.g., a "driving" activity or other movement-related activity) are additional types of events that can indicate a diversity of locations for the mobile device 102. As mentioned above, diversity of locations can increase the chance that there should be a good opportunity to calibrate the barometric pressure sensor 112 at one or more of the locations. Thus, the activity trigger ensures that the client 122 checks the calibration conduciveness of each of these locations so that such opportunities are not missed. Additionally, some activities that indicate a lack of movement (e.g., a "still" activity) can be indicative of the mobile device 102 being at the user's home, at an office, in a restaurant, or other location that is already known to the system server 104. Thus, the altitude at such a location is likely to have already been accurately determined in the past or provided in terrain data, so this altitude can be used to accurately calibrate the barometric pressure sensor 112.

Additionally, the activity confidence threshold value can be configurable for various activities, depending on values that have been empirically determined to be likely to indicate that each activity is occurring or has occurred.

The activity transition (or movement mode transition) trigger or activity transition pair trigger is set up by the client 122 for the operating system to trigger the wake-up signal to the client 122 whenever a predetermined activity transition or predetermined activity transition pair is detected by the mobile device 102 and the confidence level for the activity transition or activity transition pair is greater than or equal to an activity transition confidence threshold value or activity transition pair confidence threshold value, thereby indicating that it is likely that the mobile device 102 has experienced the predetermined activity transition and/or activity transition pair. An activity transition occurs when the mobile device 102 experiences two consecutive different activities (e.g., a driving-to-still transition), two consecutive identical (e.g., driving) activities that occur with a time gap in between, or two consecutive identical activities that have different confidence levels. This is advantageous because some activity transitions or activity transition pairs (e.g., two transitions that occur one immediately after the other, such as a driving-to-still transition immediately followed by a still-to-driving transition) are additional types of events that can indicate a diversity of locations for the mobile device 102 or other specific circumstances that could be conducive to barometric sensor calibration opportunities. Thus, the activity transition trigger or activity transition pair trigger ensures that the client 122 checks the calibration conduciveness of each of these locations or circumstances so that such opportunities are not missed. Additionally, the activity transition confidence threshold value and/or activity transition pair confidence threshold value can be configurable for various activity transitions and/or activity transition pairs, depending on values that have been empirically determined to be likely to indicate that each activity transition and/or activity transition pair is occurring or has occurred. U.S. patent application Ser. No. 17/443,281, filed Jul. 23, 2021, and titled "Barometric Pressure Sensor Calibration Based On Activity Context", describes determining whether a situation is conducive to calibration of a barometric pressure sensor in a mobile device by determining a likely activity of the mobile device based on activity transition pairs. U.S. patent application Ser. No. 17/443,281 is assigned in common with the present application and is incorporated herein by reference as if fully set forth herein.

The time period trigger is set up by the client 122 for the operating system to trigger the wake-up signal to the client 122 when a specified time interval is detected to have passed since the immediately previous calibration data collection event. The specified time interval between each time period trigger can be configurable based on a current collection mode state (described below) in minutes, hours or days (e.g., one every 5 min, 15 min, 60 min, 75 min, 1 hr, 2 hr, 1 day, etc.). The time period trigger is generally a failsafe against network connectivity outages (i.e., confirms to the system server 104 that the mobile device 102 is still operational). However, depending on the nature of the circumstances under which the time period trigger occurs, the circumstances may or may not be conducive to calibration of barometric pressure sensor 112. This is advantageous because if none of the other trigger events occur over a predetermined time period, then the time period trigger ensures that the system server 104 is aware of the operational status of the mobile device 102 and that calibration data collection (and the calibration process) will occur within an appropriate time period after the previous calibration data collection. The time period trigger is thus also a failsafe that ensures that the calibration value will not become stale or less reliable due to none of the other trigger events occurring within a reasonable time period. In some embodiments, the client 122 posts data to the barometer calibration end point 132 in the system server 104 within a minimum time period (e.g., a configurable time that may be about 12, 24, 36 or 48 hours) even if the client 122 does not have any calibration data to post (i.e., an empty payload).

The specific time trigger is set up by the client 122 for the operating system to trigger the wake-up signal to the client 122 at one or more specified or predetermined time points during a day, week or month. This is advantageous because specific times of the day, week or month can be mapped to specific predetermined activities that are typically conducive to calibration (i.e., a time when the user works in a garden outside at their home, a time when the user walks around their neighborhood, a time when the user commutes to work, a time when the user is sleeping, or other appropriate regularly-performed activities when the mobile device 102 will likely be at a known location).

Some of the example trigger events described above are related to each other and might have some overlap in the situations in which they might occur. This is acceptable, since the conditions that cause one trigger event to be detected might not necessarily rise to the level needed to cause a related or redundant trigger event also to be detected. Thus, this overlap, or redundancy, ensures that at least one of the trigger events is likely to be detected, so that an opportunity that is conducive to calibration is not likely to be missed. Additionally, when any of the trigger events occurs, if conditions are determined by the mobile device 102 not to be conducive to a proper or reliable calibration, then the calibration data collection or the calibration process will not be performed, the data collected will not be used for calibration purposes, and/or the generated calibration value will not be used to calibrate the pressure sensor.

In response to receiving the wake-up (or alert) signal from the operating system, the client 122 begins the calibration data collection process. The following description of the calibration data collection process is one example of how the process may proceed. Other examples may include different combinations or orders of trigger event checks (described below).

In some embodiments, when the client 122 receives the wake-up signal, there is no indication of which trigger event caused the operating system to send the wake-up signal. In this case, therefore, the client 122 checks available data for each type of trigger event (i.e., performs a "trigger event check") to confirm that a trigger event has indeed occurred or to determine and confirm which trigger event occurred as described below. The trigger event check can step through each of the types of trigger events in any appropriate order to find one that has occurred. An example order for checking the trigger events (for an example in which only some of the types of trigger events have been implemented) may be in the order of: a "charging trigger check" (described below), a "time period trigger check" (described below), a "Wi-Fi RSSI-change trigger check" (described below), and a "significant location change trigger check" (described below). In response to one of the trigger event checks passing, the client 122 proceeds to collect the calibration data. In response to none of the trigger event checks passing, the client 122 does not proceed with or terminates the calibration data collection process and waits for the next trigger event or wake-up signal. In other embodiments, the client

122 receives an indication of which trigger event occurred either as part of the wake-up signal or as a separate signal or data received (from the operating system) or read by the client 122. In this case, therefore, the client 122 checks available data for only the indicated trigger event to confirm that the trigger event occurred. In response to the trigger event check for the indicated trigger event passing, the client 122 proceeds to collect the calibration data. In response to the trigger event check for the indicated trigger event not passing, the client 122 does not proceed with or terminates the calibration data collection process and waits for the next trigger event or wake-up (or alert) signal.

In other embodiments, the client 122 does not determine which trigger event occurred. Instead, in response to receiving the wake-up signal, the client 122 collects the calibration data and checks the quality thereof, as described below.

In some embodiments, in response to starting the calibration data collection process, the mobile device 102 determines whether it is charging. In response to determining that the mobile device 102 is charging (i.e., the charging trigger check passing), the client 122 proceeds to the "time period trigger check" described below. In response to determining that the mobile device 102 is not charging (i.e., the charging trigger check not passing), the client 122 retrieves the battery level for its internal battery. Alternatively, the mobile device 102 subscribes to receive a battery level notification from the operating system. The client 122 compares the battery level with a configurable low-battery threshold. In response to the battery level being greater than or equal to the low-battery threshold (e.g., 10%, 20%, 30%, etc.), the client 122 proceeds with the calibration data collection process. In response to the battery level being less than the low-battery threshold, the client 122 does not proceed with or terminates the calibration data collection process and waits for the next trigger event or wake-up signal. This check of the battery level is advantageous because the calibration data collection process can be a significant drain on the internal battery, so terminating the calibration data collection process when the internal battery is relatively low prevents an unnecessary additional drain on the internal battery in a situation that calls for lowering the battery usage to extend the usability of the mobile device 102 for other purposes. In some embodiments, the client 122 disables the triggers in response to the battery level being less than the low-battery threshold, and the client 122 re-sets up, re-establishes or re-enables the triggers in response to the battery level being greater than or equal to the low-battery threshold. In some embodiments, the client 122 periodically checks whether the battery level has reached the threshold for data collection, so that it can re-set up, re-establish or re-enable the triggers.

In some embodiments, the client 122 maintains the number of times that it performs the calibration data collection process (i.e., a calibration data collection process number) in a given "maximum number" time period (e.g., 12 hours, 24 hours, 48 hours, etc.). Thus, in response to starting the calibration data collection process or the battery level being greater than or equal to the low-battery threshold, the client 122 compares the calibration data collection process number with a maximum number of calibration data collection events (e.g., 10, 15, 20, 25, 30, etc.) for the time period. (The maximum number of calibration data collection events and the duration of the time period may be set according to a configurable maximum number value and a configurable maximum number time period value provided in the configuration object.) In some embodiments, in response to the calibration data collection process number being greater than or equal to the maximum number of calibration data collection events, the client 122 does not proceed with or terminates the calibration data collection process and waits for the next trigger event or wake-up signal. Additionally, in some embodiments, the client 122 disables the triggers and waits for a timer (which times the given time period, e.g., a "day/24 hr" or "maximum number" timer) to time out. In response to the maximum number timer timing out, the client 122 re-sets up, re-establishes or re-enables the triggers. On the other hand, in response to the calibration data collection process number being less than the maximum number of calibration data collection events, the client 122 proceeds with the calibration data collection process. This check of the calibration data collection process number is advantageous because it prevents the client 122 from performing the calibration data collection process at a time when it is unnecessary, since the client 122 has already performed the calibration data collection process a sufficient number of times within the maximum number time period, so it can be assumed that the current calibration value is adequate or reliable provided the current calibration confidence is also within a reasonable threshold. Any additional calibration data collection process at this time would be an unnecessary drain on the internal battery of the mobile device 102 or the resources of the system 100.

In some embodiments, the client 122 maintains a timer (e.g., a "latest collection" timer), which indicates the amount of time that has passed since the latest or most recent calibration data collection event. The client 122 compares the value of the latest collection timer with a minimum interval between collection times (i.e., the "time period trigger check"). (The minimum interval between collection times may be set according to a minimum time value provided in the configuration object.) In response to the value of the latest collection timer being greater than or equal to the minimum interval between collection times (i.e., the time period trigger check passing), the client 122 proceeds with the calibration data collection process. In response to the value of the latest collection timer being less than the minimum interval between collection times (i.e., the time period trigger check not passing), the client 122 does not proceed with or terminates the calibration data collection process and waits for the next trigger event or wake-up signal. The time period trigger check of the latest collection timer is advantageous because it prevents the client 122 from performing the calibration data collection process too soon after the latest or most recent calibration data collection event, since it can be assumed that the current calibration value is adequate or reliable (provided the current calibration confidence is within a reasonable threshold), and any additional calibration data collection process at this time would be an unnecessary drain on the internal battery of the mobile device 102 or the resources of the system 100.

In some embodiments, in response to starting the calibration data collection process, the time period trigger check passing, receiving the wake-up signal from the operating system, or receiving an indication of the Wi-Fi RSSI-change trigger event, the client 122 performs the Wi-Fi RSSI-change trigger check. The client 122 thus reads the current Wi-Fi SSID (Service Set Identifier) and RSSI (Received Signal Strength Indicator) values stored in the mobile device 102. The client 122 then compares the current Wi-Fi SSID with a previous Wi-Fi SSID obtained for the latest or most recent calibration data collection process. In response to the current Wi-Fi SSID not matching the previous Wi-Fi SSID (i.e., the Wi-Fi RSSI-change trigger check not passing), the client 122 proceeds to the next trigger check if any. In response to the current Wi-Fi SSID matching the previous Wi-Fi SSID, the client 122 determines a Wi-Fi RSSI-change value based on the current Wi-Fi RSSI and a previous Wi-Fi RSSI obtained for the latest or most recent calibration data collection process. The client 122 then compares the Wi-Fi RSSI-change value with the Wi-Fi RSSI-change threshold. In response to the Wi-Fi RSSI-change value being less than the Wi-Fi RSSI-change threshold (i.e., the Wi-Fi RSSI-change trigger check not passing), the client 122 proceeds to the next trigger check if any. In response to the Wi-Fi RSSI-change value being greater than or equal to the Wi-Fi RSSI-change threshold (i.e., the Wi-Fi RSSI-change trigger check passing), the client 122 proceeds to collect calibration data and can skip any other trigger check.

In response to there being no current Wi-Fi SSID or RSSI information, the Wi-Fi RSSI-change trigger check not passing, receiving the wake-up signal from the operating system, or receiving an indication of the significant location change trigger event, the client 122 performs the significant location change trigger check. Thus, the client 122 obtains the current 2D or horizontal location of the mobile device 102 from the position sensor 108. The client 122 then determines the location change value based on the current 2D or horizontal location and a previous 2D or horizontal location obtained for the latest or most recent calibration data collection process. The client 122 then compares the location change value with the distance threshold value. In response to the location change value being less than the distance threshold value (i.e., the significant location change trigger check not passing), the client 122 proceeds to the next trigger check if any. In response to the location change value being greater than or equal to the distance threshold value (i.e., the significant location change trigger check passing), the client 122 proceeds to collect calibration data and can skip any other trigger check.

In some embodiments, in response to the charging trigger check passing, the client 122 does not perform the significant location change trigger check. Instead, the client 122 proceeds to collect calibration data. In some embodiments, the client 122 does not perform the significant location change trigger check in response to any other trigger event when the charging trigger check passes. Thus, when the internal battery of the mobile device 102 is charging, the time period trigger event would always cause collection of the calibration data, so that there is a periodically recurring calibration data collection during any charging trigger event or any time period when the internal battery of the mobile device 102 is charging. For all trigger events other than the charging trigger event, the client 122 checks whether the location of the mobile device 102 has changed since the previous calibration data collection. The client 122 then terminates the calibration data collection if the location has not changed, since it is typically unnecessary to collect calibration data again at the same location as the previous calibration data collection. For the charging trigger event, however, since power consumption is not an issue, it is considered desirable to go ahead and perform the calibration data collection anyway.

The performance of each calibration data collection event by the client 122 is based on parameters that include a duration time for each collection event, a duration time for each pressure measurement or sample taken during the collection event (i.e., each pressure record), and an interval time between each pressure measurement or sample. These parameters may be provided in the configuration object.

For the calibration data collection event, the client 122 or the system server 104 collects location data from one or more of each available type of location provider, pressure data from nearby reference pressure stations or transmitters 202 in the network of terrestrial transmitters or reference pressure stations, and pressure data from the barometric pressure sensor 112 of the mobile device 102. The pressure data generally includes the configured number of pressure records (i.e., "n" collected pressure records) separated by the interval time between pressure records. The pressure samples may be received at a 10-Hz rate from the API for the barometric pressure sensor 112. There will also be an array of location data from each available type of location provider and pressure data from the nearby reference pressure stations or transmitters 202. All of this data is referred to as a calibration data unit.

For example, the configuration for a calibration data collection event may be 60 seconds for the duration time of the collection event, 15 seconds for the interval time between each pressure measurement or sample, and 3 seconds for the duration time for each pressure measurement or sample. This will yield 5 pressure records with start times for each pressure record that are 15 seconds apart.

For a successfully collected calibration data unit, the client 122 performs data quality checks. Any combination of one or more of the following example data quality checks may be performed.

A first example data quality check is a pressure variance check in which the client 122 determines the pressure variance across the "n" collected pressure records. Then the client 122 compares the pressure variance with a configurable pressure variance threshold (e.g., about 100 Pa², which is provided in the configuration object). In response to the pressure variance being greater than or equal to the pressure variance threshold, the client 122 discards the calibration data unit, does not proceed with or terminates the calibration data collection process, and waits for the next trigger event. In response to the pressure variance being less than the pressure variance threshold, the client 122 discards any pressure data value within the collection event that does not meet this pressure variance threshold, keeps the remaining pressure data, and proceeds with the calibration data collection process.

A second example data quality check is a pressure range check in which the client 122 checks that the pressure records are within configurable minimum and maximum pressure values as provided in the configuration object. Thus, the client 122 compares each of the pressure records with the minimum and maximum pressure values. In response to any of the pressure records being less than the minimum pressure value or greater than the maximum pressure value (i.e., not within the minimum and maximum pressure values), the client 122 discards the location data value within the collection event that is not within the minimum and maximum pressure values. In response to there being no pressure records that are within the minimum and maximum pressure values (inclusive), the client 122 discards the calibration data unit, does not proceed with or terminates the calibration data collection process, and waits for the next trigger event. In response to there being at least one pressure record that is within the minimum and maximum pressure values (inclusive), the client 122 proceeds with the calibration data collection process.

A third example data quality check is a 2D spread check in which the client 122 checks that the 2D location values in the calibration data unit, indicating respective 2D locations at which each pressure data value was collected, fall within a configurable 2D location radius provided in the configuration object. The value of the 2D location radius depends on the length of the calibration data collection event time window, e.g., a longer window leads to a larger radius and a shorter window leads to a shorter radius. Thus, the client 122 compares each of the 2D location values with the 2D location radius. In response to any of the 2D location values not being within the 2D location radius, the client 122 discards these 2D location values that are not within the 2D location radius. In response to there not being any of the 2D location values that are within the 2D location radius, the client 122 discards the calibration data unit, does not proceed with or terminates the calibration data collection process, and waits for the next trigger event. In response to there being at least one of the 2D location values that is within the 2D location radius, the client 122 proceeds with the calibration data collection process.

A fourth example data quality check is a 2D uncertainty check in which the client 122 checks that there is at least one 2D location uncertainty value for the 2D location values in the calibration data unit that is less that a 2D uncertainty threshold provided in the configuration object. Additionally, the client 122 discards 2D location data values (if any) within the calibration data collection event that do not meet the 2D uncertainty threshold. The client 122 compares the 2D location uncertainty values in the calibration data unit with the 2D uncertainty threshold. In response to there being no 2D location uncertainty value that is less than the 2D uncertainty threshold, the client 122 discards the calibration data unit, does not proceed with or terminates the calibration data collection process, and waits for the next trigger event. In response to there being at least one 2D location uncertainty value that is greater than or equal to the 2D uncertainty threshold, the client 122 proceeds with the calibration data collection process.

In response to any of the data in the calibration data unit not passing any one or more of the data quality checks, the client 122 removes that data from the calibration data unit. In response to any of the data remaining in the calibration data unit (i.e., that successfully passed all of the data quality checks), the client 122 stores the calibration data unit locally on the mobile device 102 and proceeds with the calibration process. In response to none of the data in the calibration data unit successfully passing all of the data quality checks, the client 122 discards all of the data in the calibration data unit, does not proceed with or terminates the calibration data collection process, and waits for the next trigger event.

The data collection elements in the calibration data unit for each calibration data collection event generally include the collection timestamp indicating the time of the calibration data collection event, the Wi-Fi location (if applicable or available), the Wi-Fi information (e.g., SSIDs, MAC-Addresses, RSSIs), the GNSS Location (depending on the power impact to the mobile device 102), the GNSS information (e.g., Constellation-ID, SVIDs, C/Nos), the summary statistics of the pressure records (e.g., average, variance, count, minimum and maximum), the pressure records themselves, the temperature records (if available) either in summary statistic form or the records themselves, and the type of the trigger event. The calibration data unit is stored locally for later batch upload to the system server 104 (e.g., if in "normal" mode). The client 122 also maintains a total count for the number of calibration data collection events (e.g., 100, 150, 200, 250, 300, etc.) stored locally. The client 122 expires or deletes the oldest stored calibration data collection event in response to the total count being reached and new calibration data collection events are being added to the local store.

In some embodiments, when in "normal" mode or "urgent" mode, the client 122 uploads the locally stored calibration data collection events to the barometer calibration API of the system server 104 each time a charging trigger is received and after calibration data collection events that are in response to charging trigger events are completed (based on settings in the configuration object). Additionally, the client 122 attempts data upload (provided it has a local log of calibration data collection events to upload) once every upload time period interval (e.g., 12 hr, 24 hr, 36 hr, 48 hr, etc., based on the settings in the configuration object) as indicated by an upload timer when in normal mode. In some embodiments, when in urgent mode and real-time upload is enabled by settings in the configuration object, the client 122 uploads the locally stored calibration data collection events to the barometer calibration API of the system server 104 immediately (i.e., live). In some embodiments, the client 122 deletes the locally stored calibration data collection events when an upload to the system server 104 is successful.

Figure 3:
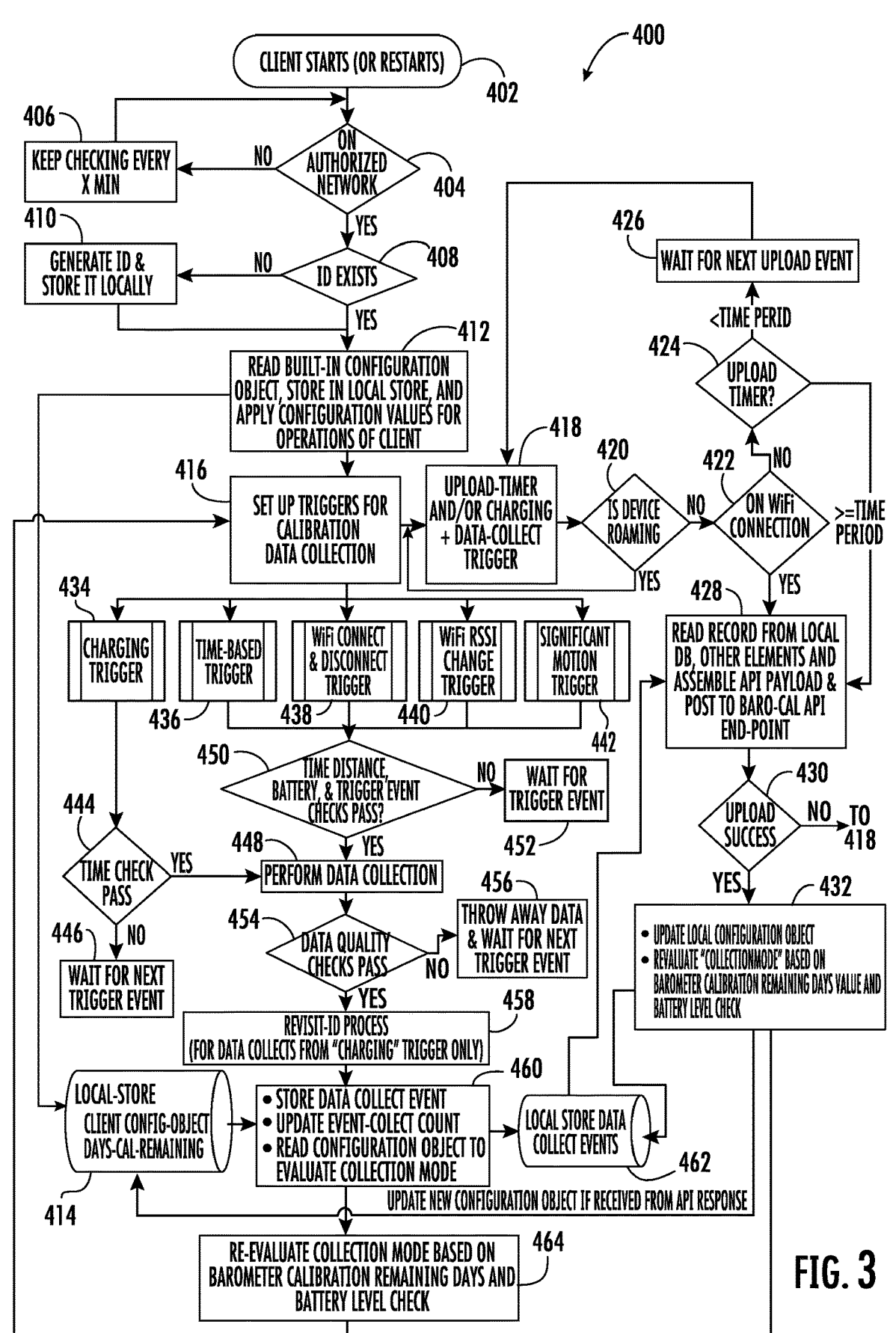
FIG. 3 is a simplified flowchart for a process for a client within the calibration system shown in FIG. 1, in accordance with some embodiments.

FIG. 3 is a simplified flowchart for an example process 400 for the client 122, in accordance with some embodiments. The particular steps, combination of steps, and order of the steps for this process are provided for illustrative purposes only. Other processes with different steps, combinations of steps, or orders of steps can also be used to achieve the same or similar result. Features or functions described for one of the steps performed by one of the components may be enabled in a different step or component in some embodiments. Additionally, some steps may be performed before, after or overlapping other steps, in spite of the illustrated order of the steps. Furthermore, there may be some differences in the flow of the process 400 based on whether the client 122 is in the urgent mode or the normal mode. In addition, some of the functions (or alternatives for these functions) of the process 400 have been described above.

Upon starting (at 402), the client 122 optionally determines (at 404) whether it is on an authorized service provider network. In response to the client 122 not being on an authorized service provider network, the client 122 optionally keeps checking (at 406) every X minutes (e.g., 1, 2, 5, 10, 20, 30, etc. minutes) for an authorized service provider network. On the other hand, in response to the client 122 being on an authorized service provider network, the client 122 determines (at 408) whether an instance ID exists in local storage. If not present, the client 122 generates (at 410) the instance ID and stores it locally for future use. If present, the client 122 proceeds to read (at 412) the built-in configuration object and stores it in the local store (at 414) of the mobile device 102. The client 122 also applies the configuration values or settings from the configuration object for the various operations of the client 122. At 416, the client 122 sets up the data collection triggers for the calibration data collections using the values or setting in the configuration object for the appropriate collection mode.

After 416, the client 122 determines (at 418) that the upload timer has timed out and/or the charging trigger has been received and the calibration data collection events in response to the charging trigger events have been completed, i.e., it is time for an upload event. Then the client 122 determines (at 420) whether the mobile device 102 is roaming. In response to the mobile device 102 roaming, then the client 122 does not upload the calibration data, thereby avoiding potential roaming charges, and returns to 418 to wait for the next upload event. In response to the mobile device 102 not roaming (as determined at 420), the client 122 determines (at 422) whether the mobile device 102 is on a Wi-Fi connection. In response to the mobile device 102 not being on a Wi-Fi connection (at 422), the client 122 checks (at 424) the upload timer against the upload time period interval. In response to the upload timer being less than the upload time period interval (at 424), the client 122 waits (at 426) for the next data upload event to occur at 418.

In response to the upload timer being greater than or equal to the upload time period interval (at 424), the client 122 reads (at 428) the records for the stored calibration data collection events from the local store (e.g., a local database) and other appropriate elements, assembles an API payload with this information, and posts or uploads the API payload to the barometer calibration API end point 132 in the system server 104. Then the client 122 determines (at 430) whether the upload event has been successful. In response to the upload event not being successful (at 430), the client 122 returns to 418 to wait for the next upload event. In response to the upload event being successful (at 430), the client 122 deletes (at 432) the successfully uploaded records for the calibration data collection events from the local store, receives back and processes the barometer calibration API response, updates the locally stored (at 414) configuration object if received from the barometer calibration API response, and re-evaluates the collection mode based on the barometer calibration remaining days value and a check of the battery level. The client 122 then returns to 416 described above.

After 416, and after the charging trigger event occurs (at 434), the client 122 also determines (at 444) the passing or not passing of the time period trigger check (time check pass). In response to the time period trigger check not passing (at 444), the client 122 does not proceed with or terminates the calibration data collection process and waits (at 446) for the next trigger event or wake-up signal. In response to the time period trigger check passing (at 444), the client 122 proceeds to perform (at 448) the calibration data collection.

After 416, and after any of the other trigger events occurs (examples shown at 436-442), the client 122 also determines (at 450) the passing or not passing of the various checks described above, including the passing or not passing of the time period trigger check (time), how the location change value compares with the distance threshold value (distance), how the battery level compares with the low-battery threshold (battery), and the passing or not passing of the trigger event checks. In response to any of these various checks not passing (at 450), the client 122 does not proceed with or terminates the calibration data collection process and waits (at 452) for the next trigger event or wake-up signal to occur at 434-442. In response to these various checks passing (at 450), the client 122 proceeds to perform (at 448) the calibration data collection.

After the calibration data collection at 448, the client 122 determines (at 454) the passing or not passing of the various data quality checks described above. In response to any of the data quality checks not passing (at 454), the client 122 discards or throws away (at 456) the data in the calibration data unit, does not proceed with or terminates the calibration data collection process, and waits for the next trigger event to occur at 434-442.

In response to the data quality checks passing (at 454), the client 122 performs (at 458) a revisit-ID process only for calibration data collection events resulting from charging trigger events. A description of such revisits or repeat visits and the clustering thereof is provided in U.S. patent application Ser. No. 17/647,826, filed Jan. 12, 2022, and titled "Calibrating A Pressure Sensor", which is assigned in common with the present application and is incorporated herein by reference as if fully set forth herein. Additionally, clustering of such data is described in U.S. Pat. No. 11,460,298, filed Mar. 26, 2019, and titled "SYSTEMS AND METHODS FOR ESTIMATING A DIFFERENCE IN HEIGHT BETWEEN TWO FLOORS IN A BUILDING FOR USE IN ESTIMATING A HEIGHT OR AN ALTITUDE OF ONE OF THE TWO FLOORS", which is assigned in common with the present application, and which is incorporated herein as if set forth fully herein.

In response to the data quality checks passing (at 454) or after the revisit-ID process (at 458), the client 122 (at 460) stores the calibration data collection event to the local store of calibration data collection events (at 462), updates the total count for the number of calibration data collection events (event-collect count), reads the configuration object, and re-evaluates the collection mode. The client 122 then re-evaluates (at 462) the collection mode based on the barometer calibration remaining days value and a check of the battery level. The client 122 then returns to 416 described above. Additionally, after storing the calibration data collection event to the local store of calibration data collection events (at 462), the client 122 also returns to 428 as described above.

Figure 4:
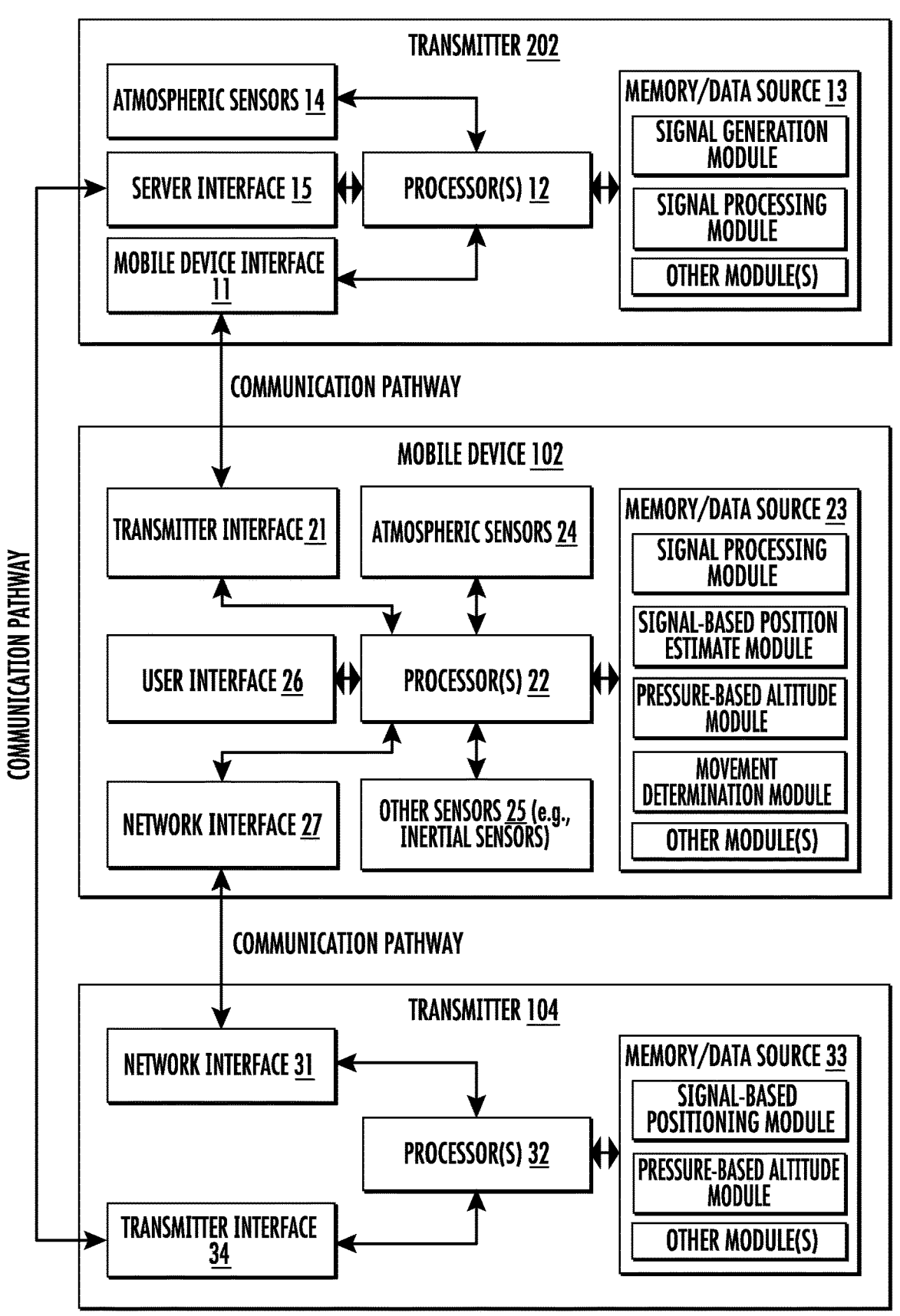
FIG. 4 shows simplified schematic diagrams of a transmitter, a mobile device, and a server, in accordance with some embodiments.

By way of example in FIG. 4, the transmitters 202 discussed herein may include: a mobile device interface 11 for exchanging information with a mobile device 102 (e.g., antenna(s) and RF front end components known in the art or otherwise disclosed herein); one or more computer processor(s) 12; memory/data source 13 for providing storage and retrieval of information and/or program instructions; atmospheric sensor(s) 14 for measuring environmental conditions (e.g., pressure, temperature, humidity, other) at or near the transmitter 202; a server interface 15 for exchanging information with a system server 104 (e.g., an antenna, a network interface, or other); and any other components known to one of ordinary skill in the art. The memory/data source 13 may include memory storing software modules with executable instructions, and the computer processor(s) 12 may perform different actions by executing the instructions from the modules, including: (i) performance of part or all of the methods as described herein or otherwise understood by one of skill in the art as being performable at the transmitter 202; (ii) generation of positioning signals for transmission using a selected time, frequency, code, and/or phase; (iii) processing of signaling received from the mobile device 102 or other source; or (iv) other processing as required by operations described in this disclosure. Signals 210 generated and transmitted by the transmitter 202 may carry different information that, once determined by the mobile device 102 or the server 104, may identify the following: the transmitter 202; the transmitter's position; environmental conditions at or near the transmitter 202; and/or other information known in the art. The atmospheric sensor(s) 14 may be integral with the transmitter 202, or separate from the transmitter 202 and either co-located with the transmitter 202 or located in the vicinity of the transmitter 202 (e.g., within a threshold amount of distance).

By way of example in FIG. 4, the mobile (or user) device 102 may include a network interface 27 for exchanging information with the server 104 via the network 106 (e.g., a wired and/or a wireless interface port, an antenna and RF front end components known in the art or otherwise disclosed herein); one or more computer processor(s) 22; memory/data source 23 for providing storage and retrieval of information and/or program instructions; atmospheric sensor(s) 24 (including the barometric pressure sensor 112) for measuring environmental conditions (e.g., pressure, temperature, other) at the mobile device 102; other sensor(s) 25 for measuring other conditions (e.g., compass, accelerometer and inertial sensors for measuring movement and orientation); a user interface 26 (e.g., display, keyboard, microphone, speaker, other) for permitting the mobile device 102 to receive inputs from and provide outputs to a user; and any other components known to one of ordinary skill in the art. A GNSS interface and processing unit (not shown) are contemplated, which may be integrated with other components or a standalone antenna, RF front end, and computer processors dedicated to receiving and processing GNSS signaling. The memory/data source 23 may include memory storing data and software modules with executable instructions, including the client 122, the Z-axis UBP module 124, a signal processing module, a signal-based position estimate module, a pressure-based altitude module, a movement determination module, the current calibration value, the data packet, a calibration module, and other modules. The computer processor(s) 22 may perform different actions by executing the instructions from the modules, including: (i) performance of part or all of the methods, processes and techniques as described herein or otherwise understood by one of ordinary skill in the art as being performable at the mobile device 102; (ii) estimation of an altitude of the mobile device 102 (based on measurements of pressure from the mobile device 102 and transmitter(s) 202, temperature measurement(s) from the transmitter(s) 202 or another source, and any other information needed for the computation); (iii) processing of received signals to determine position information or location data (e.g., times of arrival or travel time of the signals, pseudoranges between the mobile device 102 and transmitters 202, transmitter atmospheric conditions, transmitter and/or locations or other transmitter information); (iv) use of position information to compute an estimated position of the mobile device 102; (v) determination of movement based on measurements from inertial sensors of the mobile device 102; (vi) GNSS signal processing; (vii) assembling and transmitting the data packet 118; (viii) storing the current calibration value 116 and the data packet 118; (ix) calibrating the barometric pressure sensor 112; (x) collecting calibration data in response to trigger events; (xi) running the client 122; and/or (xii) other processing as required by operations described in this disclosure.

By way of example in FIG. 4, the server 104 may include: a network interface 31 for exchanging information with the mobile device 102 and other sources of data via the network 106 (e.g., a wired and/or a wireless interface port, an antenna, or other); one or more computer processor(s) 32; memory/data source 33 for providing storage and retrieval of information and/or program instructions; and any other components known to one of ordinary skill in the art. The memory/data source 33 may include memory storing software modules with executable instructions, such as calibration technique modules, a signal-based positioning module, a pressure-based altitude module, a calibration conduciveness module, as well as other modules for each of the above-described methods and processes or portions/steps thereof. The computer processor(s) 32 may perform different actions by executing instructions from the modules, including: (i) performance of part or all of the methods, processes and techniques as described herein or otherwise understood by one of ordinary skill in the art as being performable at the server 104; (ii) estimation of an altitude of the mobile device 102; (iii) computation of an estimated position of the mobile device 102; (iv) performance of calibration techniques; (v) calibration of the mobile device 102; (vi) determination of calibration conduciveness for a calibration opportunity; or (vii) other processing as required by operations or processes described in this disclosure. Steps performed by servers 104 as described herein may also be performed on other machines that are remote from the mobile device 102, including computers of enterprises or any other suitable machine.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A method comprising:

setting, by a client running on a computer processor of a user device, a trigger for an operating system of the user device to send an alert to the client when a trigger event occurs, the trigger event indicating that a situation conducive to calibrating a barometric pressure sensor of the user device might have occurred;

receiving, by the client running on the computer processor, the alert indicating that the situation conducive to calibrating the barometric pressure sensor of the user device might have occurred;

performing, by the client running on the computer processor, a trigger event check to confirm whether the trigger event has occurred;

in response to the trigger event check not passing, waiting, by the client running on the computer processor, for a next alert;

in response to the trigger event check passing, collecting, by the client running on the computer processor, calibration data for calibrating the barometric pressure sensor;

uploading, by the client running on the computer processor, the calibration data to a calibration server for the calibration server to perform a calibration process and generate a calibration value for the barometric pressure sensor;

receiving, by the client running on the computer processor, the calibration value from the calibration server; and calibrating the barometric pressure sensor of the user device using the calibration value.

2. The method of claim 1, wherein:

the trigger event is a Wi-Fi connect trigger, which occurs when the user device is detected to have connected to a Wi-Fi access point.

|

3. The method of claim 1, wherein:

the trigger event is a Wi-Fi disconnect trigger, which occurs when the user device is detected to have disconnected from a Wi-Fi access point.

4. The method of claim 1, wherein:

the trigger event is a charging trigger event, which occurs when a battery of the user device is detected to be charging.

5. The method of claim 1, wherein:

the trigger event is a charging trigger event, which occurs when the user device is detected to have attached to an external power source.

6. The method of claim 1, wherein:

the trigger event is a significant motion trigger, which occurs when a detected motion for the user device exceeds a motion threshold value.

7. The method of claim 1, wherein:

the trigger event is a Wi-Fi RSSI-change trigger, which occurs when a strength of a Wi-Fi signal received by the user device as indicated by a Received Signal Strength Indicator (RSSI) is detected to have changed by more than a Wi-Fi RSSI-change threshold.

8. The method of claim 1, wherein:

the trigger event is a geofence trigger, which occurs when the user device is detected to have traversed a boundary of a geofence.

9. The method of claim 1, wherein:

the trigger event is a significant location change trigger, which occurs when a distance between two locations at which the user device has been detected to exceed a distance threshold value.

10. The method of claim 1, wherein:

the trigger event is an activity trigger, which occurs when the user device is detected to have experienced a predetermined activity.

11. The method of claim 10, wherein:

the activity trigger further occurs when a confidence level for the predetermined activity is greater than an activity confidence threshold value.

12. The method of claim 1, wherein:

the trigger event is an activity transition trigger, which occurs when the user device is detected to have experienced a predetermined activity transition.

13. The method of claim 12, wherein:

the activity transition trigger further occurs when a confidence level for the predetermined activity transition is greater than an activity transition confidence threshold value.

14. The method of claim 1, wherein:

the trigger event is a time period trigger, which occurs when a specified time interval is detected to have passed since a previous collection of calibration data.

15. The method of claim 1, wherein:

the trigger event is a specific time trigger, which occurs at a specified time point during a day.

16. A method comprising:

setting, by a client running on a computer processor of a user device, a trigger for an operating system of the user device to send an alert to the client when a trigger event occurs, the trigger event indicating that a situation conducive to calibrating a barometric pressure sensor of the user device might have occurred;

receiving, by the client running on the computer processor, the alert indicating that the situation conducive to calibrating the barometric pressure sensor of the user device might have occurred;

in response to the alert, collecting, by the client running on the computer processor, calibration data for calibrating the barometric pressure sensor;

uploading, by the client running on the computer processor, the calibration data to a calibration server for the calibration server to perform a calibration process and generate a calibration value for the barometric pressure sensor;

receiving, by the client running on the computer processor, the calibration value from the calibration server; and calibrating the barometric pressure sensor of the user device using the calibration value;

wherein:

the trigger event is an activity transition pair trigger, which occurs when the user device is detected to have experienced a predetermined activity transition pair.

17. The method of claim 16, wherein:

the activity transition trigger further occurs when a confidence level for the activity transition pair is greater than an activity transition pair confidence threshold value.

18. A method comprising:

triggering, by a client running on a computer processor of a mobile device, collection of calibration data for calibrating a barometric pressure sensor of the mobile device in response to detecting an activity transition pair for the mobile device;

in response to the triggering, collecting, by the client running on the computer processor, the calibration data for calibrating the barometric pressure sensor;

uploading, by the client running on the computer processor, the calibration data to a calibration server for the calibration server to perform a calibration process and generate a calibration value for the barometric pressure sensor;

receiving, by the client running on the computer processor, the calibration value from the calibration server; and calibrating the barometric pressure sensor of the mobile device using the calibration value.

* * * * *